United States Patent
Voigt

(10) Patent No.: US 7,119,324 B2
(45) Date of Patent: Oct. 10, 2006

(54) HIGHLY STABLE BROADBAND LIGHT SOURCE AND SUITABLE STABILIZATION METHOD THEREFOR

(75) Inventor: Sven Voigt, Freiburg (DE)

(73) Assignee: LITEF GmbH, Freiburg (DE)

( * ) Notice: Subject to any disclaimer, the term of this patent is extended or adjusted under 35 U.S.C. 154(b) by 0 days.

(21) Appl. No.: 10/546,418

(22) PCT Filed: Feb. 19, 2004

(86) PCT No.: PCT/EP2004/001639
§ 371 (c)(1),
(2), (4) Date: Aug. 19, 2005

(87) PCT Pub. No.: WO2004/074774
PCT Pub. Date: Sep. 2, 2004

(65) Prior Publication Data
US 2006/0171633 A1    Aug. 3, 2006

(30) Foreign Application Priority Data
Feb. 21, 2003   (DE) ................ 103 07 524

(51) Int. Cl.
G01J 1/04       (2006.01)
G02B 6/34       (2006.01)

(52) U.S. Cl. ............ 250/227.14; 250/227.18; 385/12; 385/37; 372/6

(58) Field of Classification Search ......... 250/227.14, 250/227.18, 227.19, 227.23, 227.27; 385/12, 385/13, 37; 372/6, 23
See application file for complete search history.

(56) References Cited

U.S. PATENT DOCUMENTS

| 5,123,070 | A   | 6/1992 | Bradley |
| 5,945,666 | A * | 8/1999 | Kersey et al. ......... 250/227.14 |
| 6,018,160 | A   | 1/2000 | Bennion et al. |
| 6,246,816 | B1* | 6/2001 | Moore et al. ................ 385/37 |
| 6,448,551 | B1  | 9/2002 | Kersey |

FOREIGN PATENT DOCUMENTS

| DE | 3148925  | 6/1983 |
| DE | 19802095 | 8/1999 |

* cited by examiner

Primary Examiner—Kevin Pyo
(74) Attorney, Agent, or Firm—Elliott N. Kramsky

(57) ABSTRACT

A highly stable broadband light source includes a semiconductor light source having a specific emission spectrum, an optical filter having a specific bandpass filtering function and a predetermined bandwidth and a coupling element, to which the light emissions of the semiconductor light source and of the optical filter are fed. The light emission of the broadband light source occurs at the output of the coupling element. The spectrum of the light emission of the broadband light source is composed of the emission spectrum of the semiconductor light source and the bandpass filtering function of the optical filter. The wavelength of the optical filter is temperature-stabilized so that the spectrum of light emission of the broadband light source is essentially determined solely by the filtering function of the optical filter.

11 Claims, 7 Drawing Sheets

HIGHLY STABLE BROADBAND LIGHT SOURCE AND SUITABLE STABILIZATION METHOD THEREFOR

BACKGROUND

1. Field of the Invention

The present invention relates to light sources. More specifically, this invention pertains to a highly stable broadband light source based on a semiconductor light source and an optical filter and a method for stabilization of such a broadband light source.

2. Description of the Prior Art

Fiber-optic gyroscopes have been used for many years in medium-accuracy navigation systems. Their use in inertial navigation systems (INS), however, has been limited by the low scale factor accuracy (>100 units per million (ppm)) that results primarily from the wavelength stability of the light source.

Highly stable superfluorescence light sources having residual wavelength inaccuracies of 0.05 units per million (ppm) per degree Celsius (0.05 ppm/° C.) are known. However, they are very expensive and employed in only a small number of high-accuracy INS systems.

Superluminescence diodes (SLDs) offer an inexpensive alternative semiconductor light source. They, however, have two significant disadvantages. First, wavelength temperature dependence is approximately $|d\lambda/dT|=400$ ppm/° C. Secondly, they age, producing undesirable wavelength drifts and, thus, poor accuracy and overall stability.

The use of Bragg gratings to improve the wavelength stability of erbium-doped superluminescence fiber sources is described, for example, in N. Cerre et al., "Fiber Bragg Grating For Use Within High-Accuracy Fiber Optic Gyroscope", *Proc. OFS* (1997). In this context, while the stability and low temperature dependence of the grating are utilized inherently, the possible results are not by themselves sufficient for use in conjunction with a semiconductor light source (e.g. a SLD).

Moreover, printed document DE 198 02 095 C1 discloses a method and device for the stabilization of the scale factor of an optical gyroscope. In the disclosed method, the emission bandwidth of a light source irradiating light into the end of a fiber is limited in the wavelength region of the intensity characteristic of the light to a much smaller transmission bandwidth by a narrowband optical transmission filter. The transmission bandwidth of the optical filter is thus actively changed in dependence of a temperature at the filter by a precalibrated look-up table. See, in addition, DE-A-31 48 925.

SUMMARY AND OBJECTS OF THE INVENTION

It is therefore an object of the invention to provide a broadband light source of high wavelength stability throughout its spectrum.

It is a further object of the invention to provide a method for stabilization of a broadband light source in which wavelength stability is determined at least in part by a plurality of filter transfer functions applied to optical filters.

The preceding and other objects are achieved by the present invention which provides, in a first aspect, a highly stable broadband light source. Such light source includes a semiconductor light source of specific emission spectrum.

An optical filter has a specific emission spectrum. A coupling element is provided. The light emissions of the semiconductor light source and of the optical filter are fed to it to affect the light of the broadband light source at its output.

The spectrum of the light emitted from the broadband light source is composed of the emission spectrum of the semiconductor light source and the bandpass filtering function of the optical filter. The wavelength of the optical filter is temperature-stabilized so that the spectrum of the light emitted from the broadband light source is essentially determined solely by the filtering function of the optical filter.

In a second aspect, the invention provides a highly stable broadband light source that again includes a semiconductor light source with a specific emission spectrum.

Two optical filters are provided, each having a specific bandpass filtering function and a predetermined bandwidth. A coupling element is provided. The light emissions of the semiconductor light source and of the optical filters are applied to it. The light emission of the broadband light source is effected at its output.

The spectrum of broadband light source emission is composed of the emission spectrum of the semiconductor light source and the bandpass filtering function of the optical filters. The wavelengths of the optical filters are stabilized so that the spectrum of the light emission of the broadband light source is essentially determined solely by the filtering function of the optical filters.

In a third aspect the invention provides a method for stabilizing a broadband light source. Such method includes the emission of light by a semiconductor light source of specific emission spectrum and by at least one optical filter of specific bandpass filtering function and bandwidth.

The emitted light is coupled in a coupling element into which the light emissions of the semiconductor light source and the optical filter are fed. The light emission of the broadband light source is effected at the output of the coupling element.

The emission light spectrum of the broadband light source is composed of the emission spectrum of the semiconductor light source and the bandpass filtering function of the optical filter. The wavelength of the optical filter is stabilized in such a way that the spectrum of light emission of the broadband light source is essentially determined solely by the filtering function of the optical filter.

The preceding and other features of the invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

DETAILED DESCRIPTION OF THE PREFERRED EMBODIMENT

Figure 1:
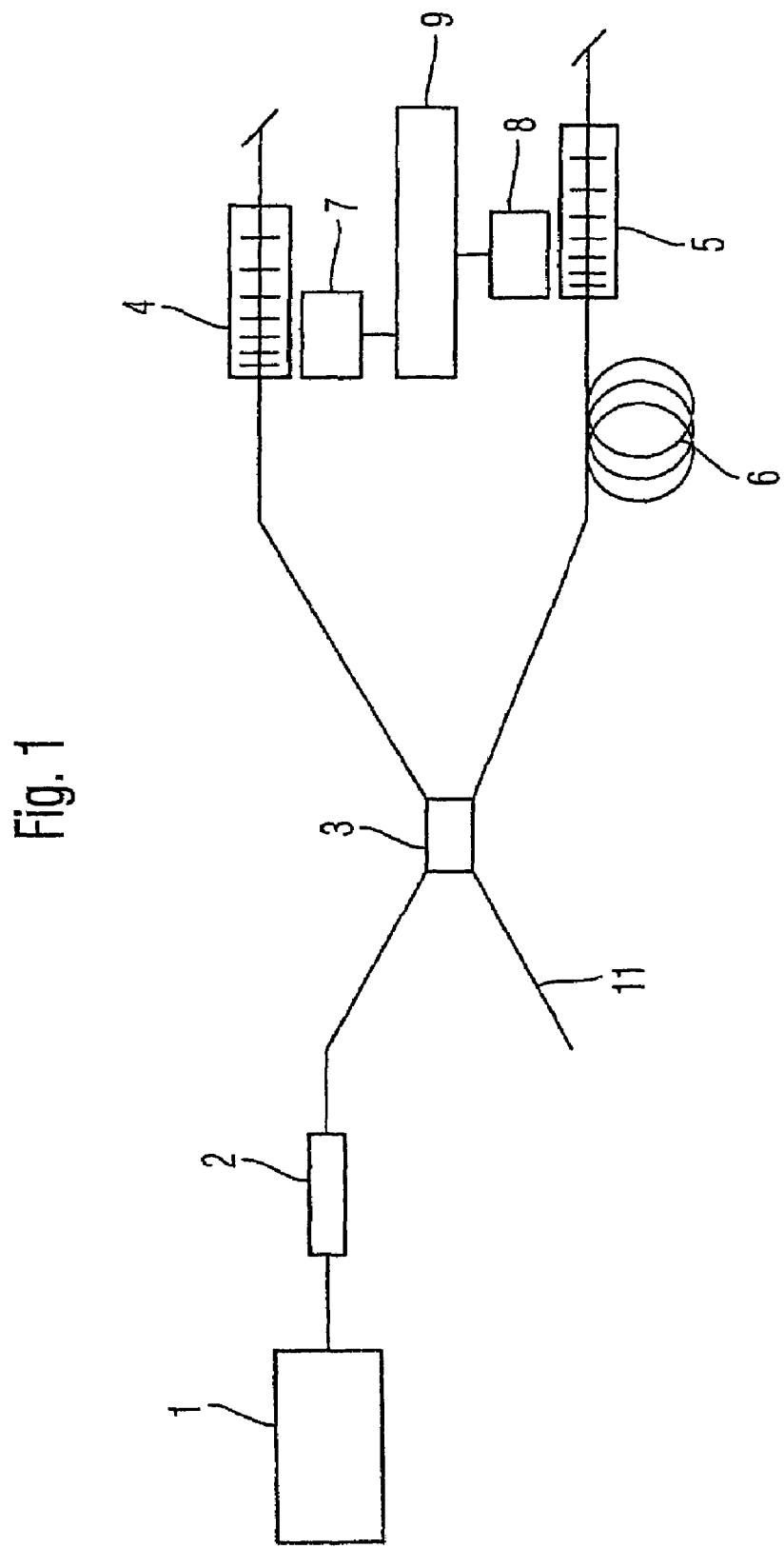
FIG. 1 is a schematic diagram of a broadband light source in accordance with the invention having two fiber Bragg gratings and a coupling element in the form of a 2×2 coupler.

FIG. 1 is a schematic diagram of a broadband light source in accordance with the invention. As shown, it includes fiber Bragg gratings and a coupling element.

In the illustrated example, a superluminescence diode 1 is employed as the semiconductor light source. The light emission of the diode 1 is output via an optical isolator 2 to an input of a coupling element 3. Two additional inputs of the coupling element 3 are connected to fiber Bragg gratings 4 and 5 of large bandwidths operated in reflection. For this reason, a 2×2 coupler or the equivalent is required as the coupling element 3. In principle, the example of FIG. 1 can be realized with a single fiber Bragg grating. An additional loss of approximately 6 dB results when a 2×2 coupler is employed.

In order to avoid such losses, one may employ two identical fiber Bragg gratings, a first fiber Bragg grating 4 and a second fiber Bragg grating 5. The gratings 4, 5 are decoupled by means of an optical delay line 6 to prevent possible interference. Due to the delay line 6, the light reflection supplied by the second fiber Bragg grating 5 acts, for the entire light source, as a second coherence spike of the same intensity as the light reflection of the first fiber Bragg grating 4. The length of the optical delay line 6 is therefore preferably chosen such that the second coherence spike does not correlate with other light paths in a fiber-optic gyroscope. The optical isolator 2 is optional, but helpful, in such an embodiment.

Each fiber Bragg grating 4 and 5 of FIG. 1 is assigned a temperature sensor 7, 8. The output signals of the sensors 7, 8 are applied to a control device 9. The functions of the control device 9 and the temperature sensors 7 and 8 will be described below.

Figure 2:
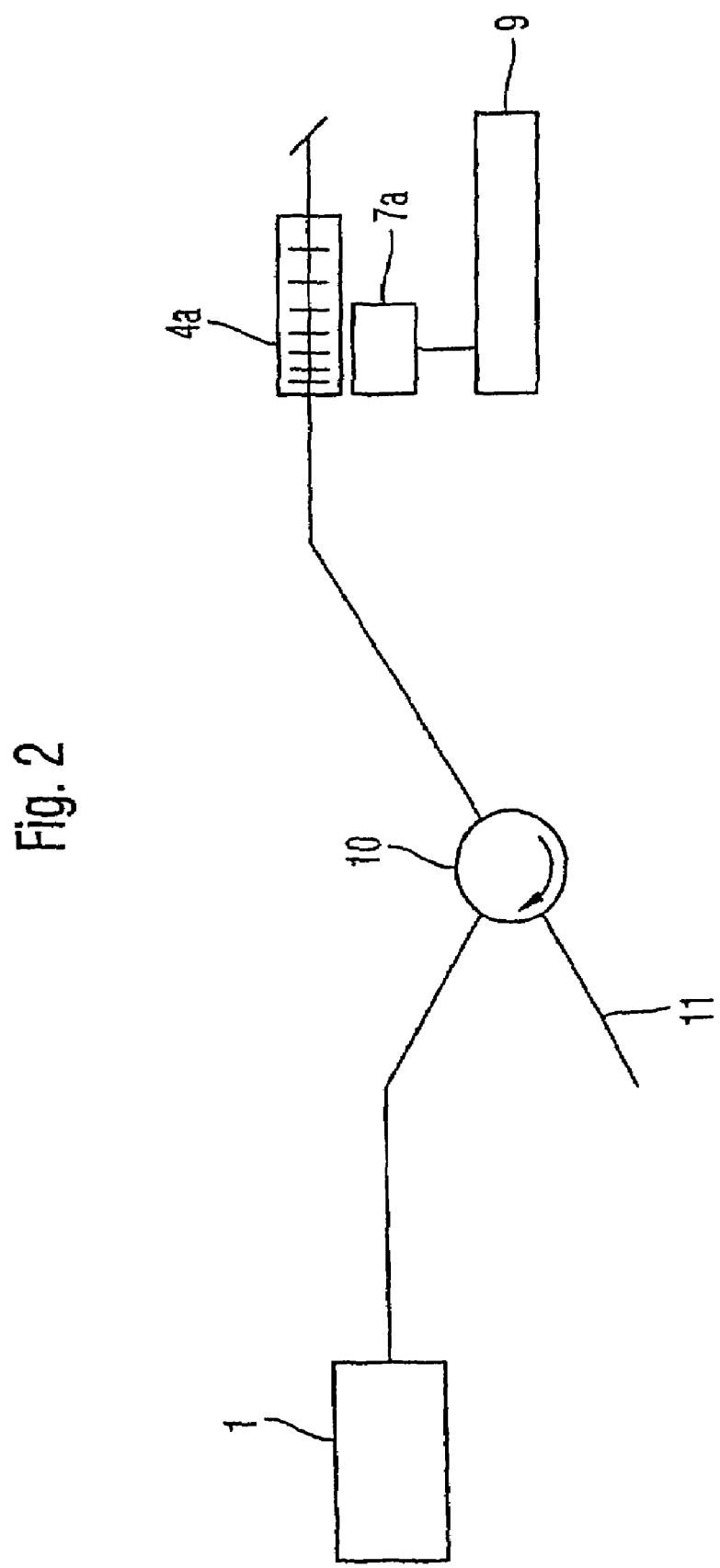
FIG. 2 is a schematic diagram of a broadband light source in accordance with the invention having a fiber Bragg grating and a coupling element in the form of an optical circulator.

FIG. 2 is a schematic diagram of a broadband light source in accordance with the invention that includes a single fiber Bragg grating 4a and an optical circulator 10 rather than a coupler 3. The additional losses occasioned by the coupler 3 are thus obviated. As a consequence, there is no need for corresponding compensation by a second fiber Bragg grating 5 as in FIG. 1. The use of an optical isolator 2 is also optional in such case (not illustrated in FIG. 2).

In each of the examples of FIGS. 1 and 2, the coupling element 3 (i.e. the optical circulator 10 in particular), has an output 11, via which the light emission (i.e. the resulting overall spectrum of the light emission of the broadband light source), is delivered.

In the present case, an optical circulator provides the preferred solution for a coupling element as the entire reflected spectrum of the filter is passed to the "free" output and no light is sent in the direction of the source. As a result, there is no need for an optical isolator to protect the light source. However, at the present time, optical circulators are still very expensive and are therefore employed for the most part in fiber-optic gyroscopes in laboratory setups.

Figure 3:
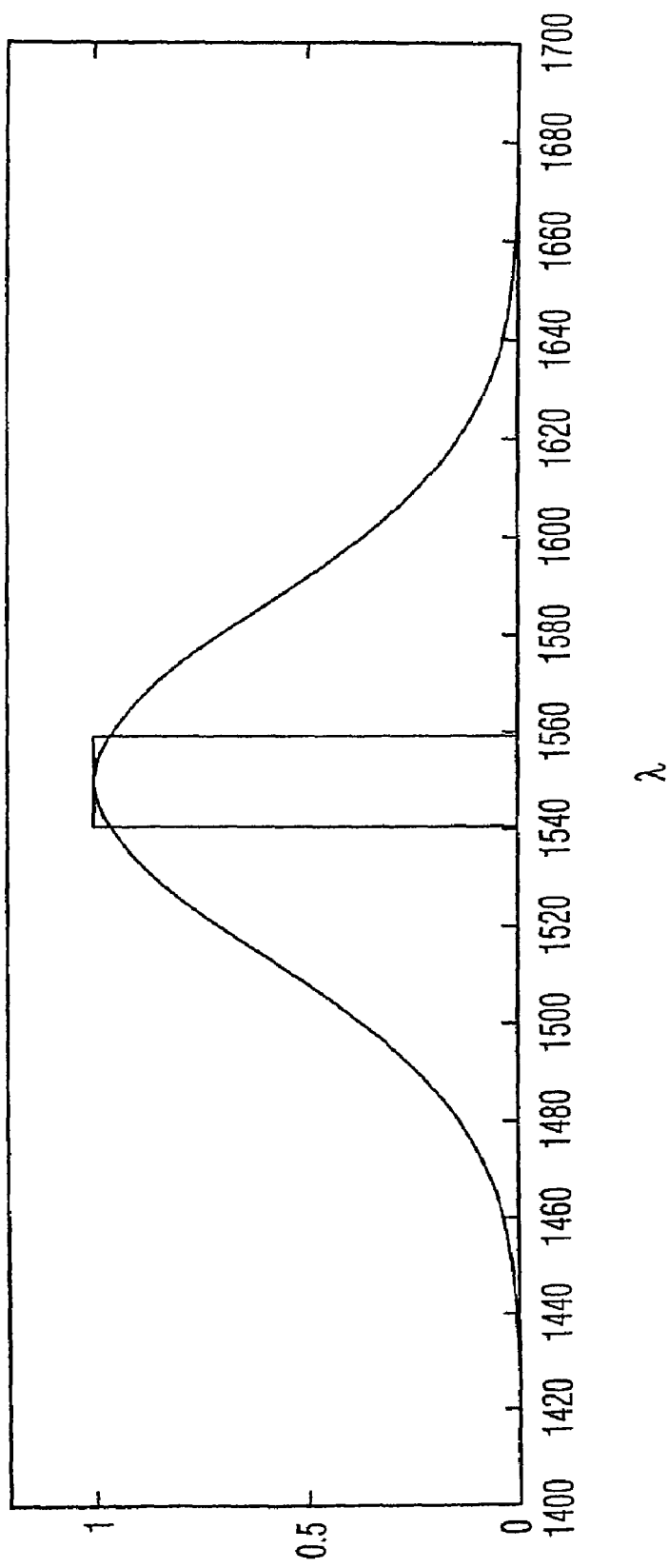
FIG. 3 is a graph that illustrates the emission spectrum of a superluminescence diode employed as a semiconductor light source in superposition with a bandpass filtering function of a fiber Bragg grating operated in reflection.

The resulting overall spectrum is composed, as shown in FIG. 3, of the Gaussian emission spectrum of the semiconductor light source 1 and the bandpass filtering function of the fiber Bragg gratings 4 and 5 (or the fiber Bragg grating 4a). For example, the half value width of the Gaussian distribution shown in FIG. 3 is 50 nm in superposition with a filtering, or splitting, function having a width of 20 nm, which falls precisely within the flat (vertex) region of the Gaussian spectrum.

Figure 4:
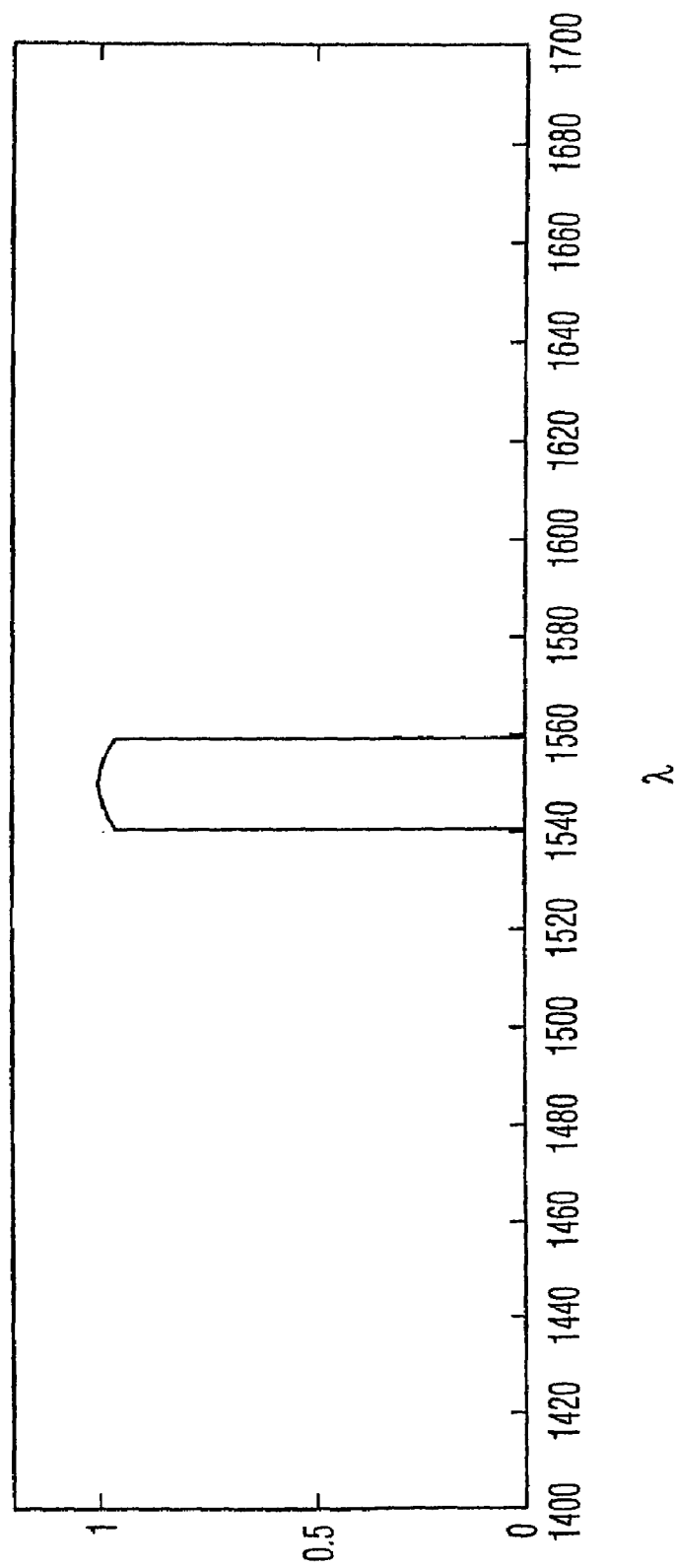
FIG. 4 is a graph that illustrates the resulting overall spectrum of the superposition of spectra in accordance with the preceding figure that occurs at the output of the broadband light source.

The resultant overall spectrum is illustrated in FIG. 4. The integral under the resulting overall spectrum of the broadband light source amounts to approximately 22% of the integral under the Gaussian function of the spectrum of the semiconductor light source 1. In the case of currently available semiconductor light sources (e.g. the superluminescence diode) the resulting light intensity is still sufficient for a fiber-optic gyroscope; there is no restriction to the rectangular filtering function illustrated. Rather it is also possible to use other filtering functions (e.g. sinc filters).

The filter type employed depends on the semiconductor light source 1. Two factors are crucial in filter selection: the maximum intensity that can be obtained in reflection (i.e. filter width and reflection coefficient); and the smallest possible change in resulting filter wavelength when a change occurs in the wavelength of the semiconductor light source 1.

Figure 5:
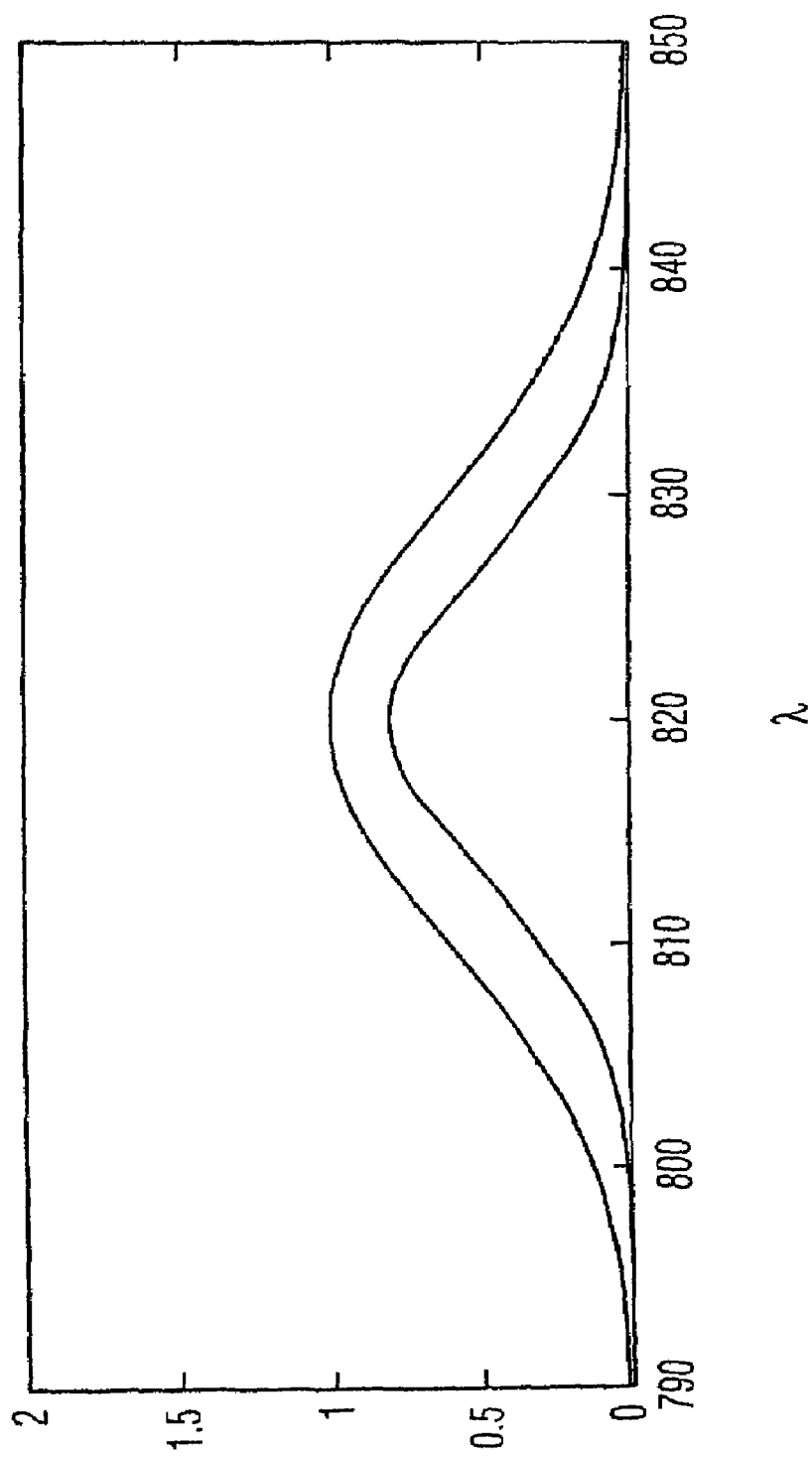
FIG. 5 is a graph that illustrates a spectrum of a Gaussian filter for stabilizing the wavelength of the broadband light source and the wavelength spectrum of a superluminescence diode.

While disadvantages of a lower intensity that arise from the first-mentioned condition can be at least partially compensated relatively simply by increasing light power, the last-mentioned condition is more difficult. Taking account of this, a Gaussian filter with a spectrum below the output spectrum of the semiconductor light source 1 (as illustrated in FIG. 5), is optimal. It is also necessary to provide maximum stability of the wavelength of the fiber Bragg gratings 4 and 5 (or the fiber Bragg grating 4a). The thermal or temperature sensitivity of the Bragg wavelength of such gratings is determined by the thermo-optical effect and the thermal linear expansion of quartz. The thermal sensitivity, in dependence on the wavelength, is approximately 10 units per million per Kelvin (10 ppm/K) at room temperature and changes slightly toward higher or lower temperatures.

To improve this value, fiber Bragg gratings may be passively stabilized initially (i.e. athermally), and then attain a residual sensitivity of up to 0.5 ppm/K. By modeling the temperature characteristic curve of such a passively stabilized grating for the Bragg wavelength, residual uncertainties of approximately one unit per million (1 ppm) result over the entire temperature range.

In simulations, it has been possible to show that, depending on the type of filter used, it is possible to achieve an improvement in the temperature dependence of the wavelength from approximately 400 ppm/K of the semiconductor light source 1 to approximately 100 ppm/K. In this case, it has proved to be particularly advantageous to use a Gaussian filter whose spectrum lies below that of the Gaussian distribution of the semiconductor light source 1, as mentioned above. Such a filter can be generally realized since optical Gaussian filters have narrower bands than the spectrum of an SLD and can be produced with a small reflection coefficient (approximately 0.8 at most).

If, in such case, the spectrum of the semiconductor light source 1 does not change excessively, (i.e. by a maximum of 2000 ppm, a value that can be readily achieved in the case of a cooled light source), no overlap arises between the spectra of the semiconductor light source 1 and those of the fiber Bragg grating(s) 4 and 5 (or 4a). Consequently, the wavelength stability of the semiconductor light source 1, or of the light emission of the overall arrangement, is determined solely by the filter based on a fiber Bragg grating.

If the temperature characteristic curve of such a fiber Bragg grating is calibrated and thermally actively stabilized using one or a plurality of temperature sensors 7, 8 (or 7a) and a control device 9 in accordance with FIGS. 1 and 2, residual wavelength uncertainties of less than 1 ppm can be achieved over the entire temperature range.

The aging of the semiconductor light source 1 must be taken into account. As a result of this, the wavelength spectrum of the semiconductor light source 1 may change over its service life during light emission. Due to the use of fiber Bragg gratings or filters in accordance with the invention, however, such aging is substantially slowed down as the resulting overall output spectrum is principally determined by the filtering function (described above). The resulting centroid wavelength, during the aging of the semiconductor light source 1, changes by a much lesser extent than the centroid wavelength of the aging semiconductor light source 1. When the Gaussian filter described above is employed, the normal aging that occurs (i.e. a wavelength drift of 3 nm corresponding to approximately 3700 ppm), has no influence on the resulting overall spectrum.

Figure 6:
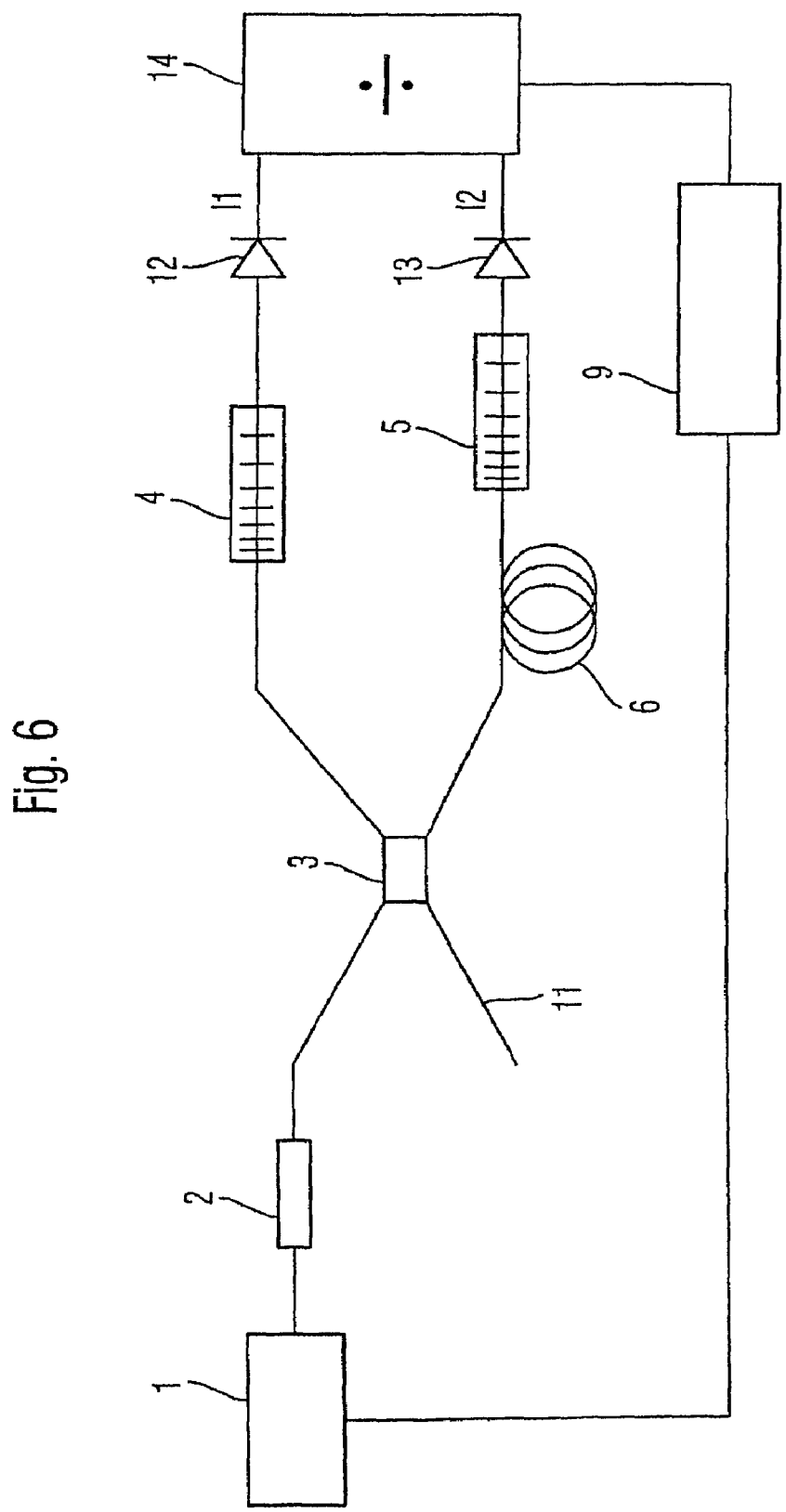
FIG. 6 is a schematic diagram of a broadband light source in accordance with an alternative embodiment of the invention.

FIG. 6 is a schematic diagram of a broadband light source in accordance with an alternative embodiment of the invention. Such embodiment may be employed when a Gaussian filter cannot be used. The basic arrangement illustrated corresponds to that of FIG. 1, with identical or comparable components designated by identical reference numerals.

Figure 7:
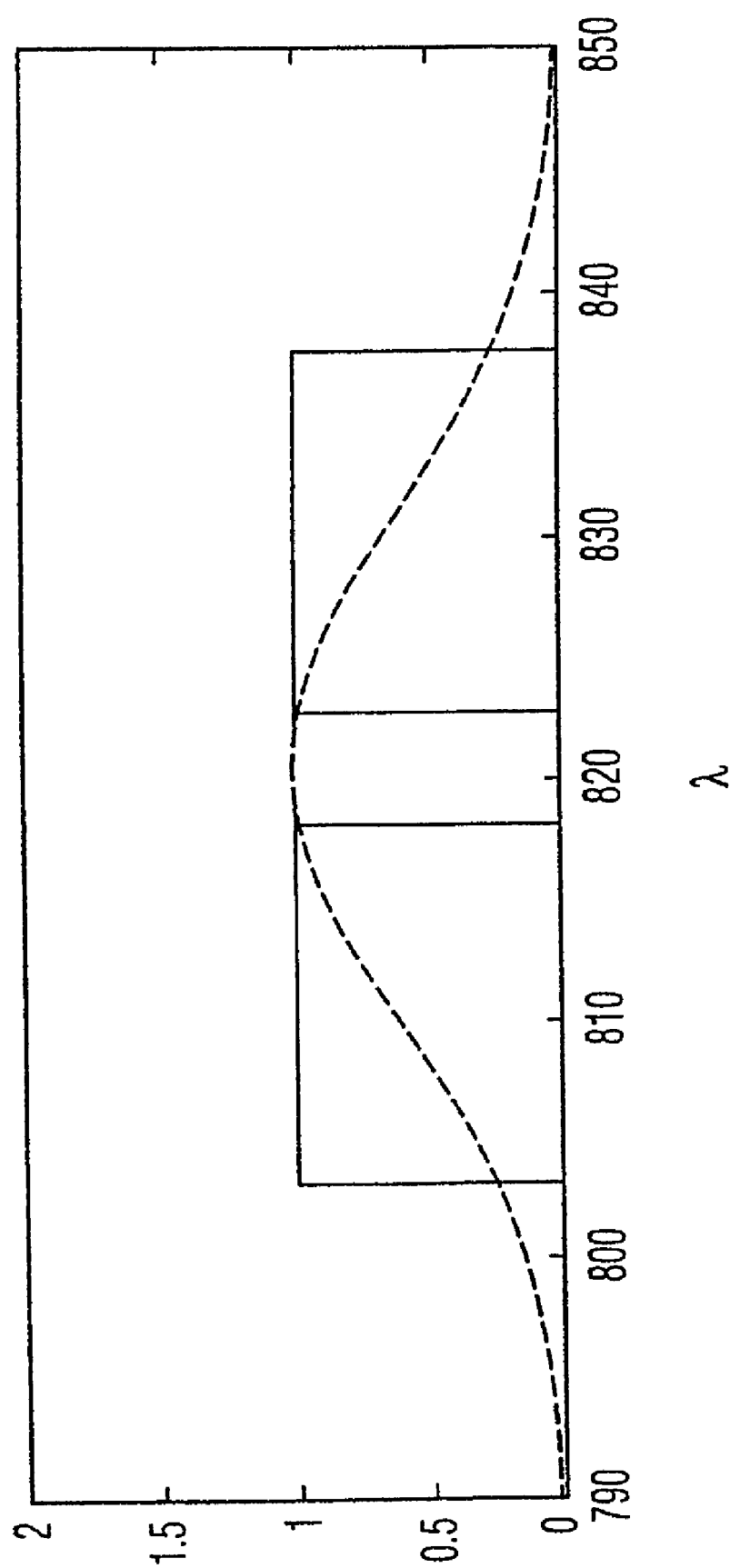
FIG. 7 is a graph that illustrates the wavelength spectrum of a broadband filter with two fiber Brag gratings in superposition with the emission spectrum of the superluminescence diode in accordance with the alternative embodiment of the invention.

In comparison to the arrangement of FIG. 1, the alternative embodiment uses two fiber Bragg gratings 4, 5, having spectra that overlap as shown by the graph of FIG. 7. The resulting filter bandwidth is greater than that of the individual fiber Bragg gratings 4, 5. The spectrum respectively transmitted by the fiber Bragg gratings 4, 5 is detected by photodetectors 12 and 13 assigned to the fiber Bragg gratings 4, 5 and is fed to a divider 14, (e.g., a digital signal processor or logarithmizer) and compared in the latter by quotient formation.

Such an arrangement produces a linear characteristic curve in a range up to 1000 ppm between the quotient I1/I2 of the intensities I1 and I2 output by the photodetectors 12 (I1) and 13 (I2). The change in wavelength is illustrated in a simplified manner in FIG. 7.

As an alternative, the quotient I1/I2 of the intensities can be fixed at 1 and the wavelength of the semiconductor light source 1 shifted with feedback by means of a control device 9, (e.g. an electronic closed-loop control unit). This is accomplished by changing the Peltier temperature such that the intensities I1 and I2 detected by the photodetectors 12, 13 remain identical.

It has been possible to show in simulations that identical maximum sensitivity is achieved when overall filter width is maximized, (e.g. to 35 nm, as illustrated in FIG. 7). The extent of spectral overlap plays a secondary part in such situation. Electronic resolution cannot be decreased arbitrarily, so drifts of less than 50 ppm can be determined or compensated for with difficulty. However, the possibility of compensating for the aging of the semiconductor light source 1 remains advantageous in the case of the illustrated embodiment.

The highly stable broadband light source in accordance with the invention is suitable not only for application to fiber-optic gyroscopes, but also to white light interferometers, optical coherence tomography, fiber Bragg sensors (temperature, strain, pressure, vibration, etc.), current and voltage sensors, metrology of fiber-optic components and the like.

While the invention has been described with reference to its presently-preferred embodiment, it is not limited thereto. Rather it is limited only insofar as it is defined by the following set of patent claims and including within its scope all equivalents thereof.

The invention claimed is:

1. A highly stable broadband light source, comprising:
   a semiconductor light source with a specific emission spectrum;
   a number of optical filters having specific bandpass filtering functions and predetermined bandwidths;
   a coupling element, to which the light emissions of the semiconductor light source and of the optical filters are fed and at the output of which the light emission of the broadband light source is effected,
   the spectrum of the light emission of the broadband light source being composed of the emission spectrum of the semiconductor light source and the bandpass filtering function of the number of optical filters; and
   the wavelengths of the number of optical filters being stabilized in such a way that the spectrum of the light emission of the broadband light source is essentially determined only by the filtering functions of the number of optical filters
   characterized in that
   the number of optical filters is two, and
   two photodetectors are provided, one of which in each case is assigned to each optical filter and detects the spectrum transmitted by the assigned optical filter and feeds it to a divider, in which the detected spectra are compared.

2. The highly stable broadband light source as claimed in claim 1, characterized in that the bandwidths of the optical filters overlap.

3. The highly stable broadband light source as claimed in claim 1, characterized in that the divider is a digital signal processor or logarithmizer in which a quotient formation is effected for the intensities of the two spectra fed.

4. The highly stable broadband light source as claimed in claim 1, characterized by a control device, which receives an output signal of the divider and controls the wavelength of the semiconductor light source with feedback in such a way that the intensities detected by the two photodetectors remain the same.

5. The highly stable broadband light source as claimed in claim 1, characterized in that the semiconductor light source is a superluminescence diode.

6. The highly stable broadband light source as claimed in claim 1, characterized in that the optical filter is a fiber Bragg grating operated in reflection.

7. The highly stable broadband light source as claimed in claim 1, characterized in that the coupling element is a 2×2 coupler.

8. The highly stable broadband light source as claimed in claim 1, characterized in that an optical isolator is arranged between the semiconductor light source and the coupling element.

9. The highly stable broadband light source as claimed in claim 1, characterized in that the optical filters are two identical fiber Bragg gratings operated in reflection, of which one feeds its light emission to the coupling element directly and the other feeds is light emission to the coupling element via an optical delay line.

10. The highly stable broadband light source as claimed in claim 9, characterized in that the length of the optical delay line is chosen such that a second coherence spike generated by the latter does not correlate with other light paths in the coupling element.

11. A method for highly stabilizing a broadband light source, comprising the following steps:
 emission of light by means of a semiconductor light source with a specific emission spectrum;
 emission of light by means of a number of optical filters with specific bandpass filtering functions and specific bandwidths;
 coupling of the emitted light in a coupling element, to which the light emissions of the semiconductor light source and of the number of optical filters are fed and at the output of which the light emission of the broadband light source is effected,
 the spectrum of the light emission of the broadband light source being composed of the emission spectrum of the semiconductor light source and the bandpass filtering functions of the number of optical filter; and
 stabilization of the wavelengths of the number of optical filters in such a way that the spectrum of the light emission of the broadband light source is essentially determined only by the filtering function of the optical filters
characterized by the steps of:
choosing the number of optical filters to be two;
providing two photodetectors;
assigning a respective one of the optical filters to a respective one of the photodetectors and detecting the spectrum transmitted by the assigned optical filter;
feeding the spectrum to a divider; and
comparing the detected spectra in the divider.

* * * * *